United States Patent
Cottle

(10) Patent No.: US 11,770,767 B2
(45) Date of Patent: Sep. 26, 2023

(54) ADVANCED POWER-SAVING MODE FOR BATTERY POWERED DEVICES

(71) Applicant: Neptune Technology Group Inc., Tallassee, AL (US)

(72) Inventor: Charles Cottle, Decatur, GA (US)

(73) Assignee: Neptune Technology Group Inc., Tallassee, AL (US)

(*) Notice: Subject to any disclaimer, the term of this patent is extended or adjusted under 35 U.S.C. 154(b) by 219 days.

(21) Appl. No.: 17/182,340

(22) Filed: Feb. 23, 2021

(65) Prior Publication Data

US 2021/0266830 A1   Aug. 26, 2021

Related U.S. Application Data

(60) Provisional application No. 62/981,610, filed on Feb. 26, 2020.

(51) Int. Cl.
*H04W 52/02* (2009.01)
*H04W 76/19* (2018.01)
*H04W 76/10* (2018.01)

(52) U.S. Cl.
CPC ....... *H04W 52/0216* (2013.01); *H04W 76/10* (2018.02); *H04W 76/19* (2018.02)

(58) Field of Classification Search
CPC . H04W 52/02; H04W 52/0216; H04W 76/10; H04W 76/19; Y02D 30/70
See application file for complete search history.

(56) References Cited

U.S. PATENT DOCUMENTS

| | | | |
|---|---|---|---|
| 8,782,741 B1 * | 7/2014 | L'Heureux | H04W 36/0022 726/3 |
| 10,212,690 B1 | 2/2019 | Lau et al. | |
| 10,225,802 B2 | 3/2019 | Jia | |
| 10,499,340 B1 * | 12/2019 | Lin | H04W 52/0296 |
| 2011/0305215 A1 * | 12/2011 | Hofmann | H04W 52/0216 370/329 |
| 2013/0278421 A1 * | 10/2013 | Sutton | G06F 13/4291 340/540 |
| 2015/0181565 A1 * | 6/2015 | Sirotkin | H04W 36/14 370/329 |
| 2015/0215777 A1 * | 7/2015 | Sirotkin | H04L 63/062 455/411 |
| 2016/0286491 A1 * | 9/2016 | Han | H04W 52/0216 |
| 2017/0013553 A1 * | 1/2017 | Huang | H04W 52/0209 |
| 2017/0094599 A1 * | 3/2017 | Eskelinen | H04W 60/02 |
| 2017/0201946 A1 * | 7/2017 | Hsu | G06F 1/3228 |
| 2018/0046805 A1 * | 2/2018 | Le Roy | G06F 21/6245 |
| 2018/0376417 A1 | 12/2018 | Wang et al. | |
| 2019/0200168 A1 * | 6/2019 | Stapleford | H04W 4/029 |
| 2020/0067922 A1 * | 2/2020 | Avetisov | H04L 63/18 |
| 2020/0236727 A1 * | 7/2020 | Salkintzis | H04W 28/24 |
| 2020/0280917 A1 * | 9/2020 | Hua | H04W 76/28 |
| 2020/0396299 A1 * | 12/2020 | Mitsov | H04L 63/0807 |
| 2021/0136157 A1 * | 5/2021 | Kauppila | H04L 67/146 |

* cited by examiner

*Primary Examiner* — Walli Z Butt
(74) *Attorney, Agent, or Firm* — Snyder, Clark, Lesch & Chung, LLP

(57) ABSTRACT

A user equipment device (UE) establishes a communication session with a wireless network, and receives, from the wireless network, a message that includes scheduling data that schedules a power-saving mode (PSM) at the UE. The UE interrupts, at a first time based on the scheduling data, a supply of power to a modem of the UE. The UE provides, based on the scheduling data at a second time that is subsequent to the first time, power to the modem.

20 Claims, 8 Drawing Sheets

ADVANCED POWER-SAVING MODE FOR BATTERY POWERED DEVICES

CROSS-REFERENCE TO RELATED APPLICATION

This application claims priority under 35 U.S.C. § 119 based on U.S. Provisional Application No. 62/981,610, filed Feb. 26, 2020, the disclosure of which is hereby incorporated by reference herein.

BACKGROUND

The "Internet of Things" (IoT) is a network of devices (i.e., "things") that are typically designed for a specific function, unlike general computing devices such as desktop or laptop computers. IoT devices, or "machine-to-machine" (M2M) devices, are embedded with electronics and network connectivity components that enable these devices to collect, store and exchange data. The types of network connectivity may include, for example, Bluetooth connectivity, Wi-Fi connectivity, other short-range communication protocols, and/or cellular network connectivity. An IoT device may have computational capability, with various types of installed software (e.g., apps), and may also include one or more of various types of sensors. IoT sensors may include, for example, temperature sensors, humidity sensors, pedestrian sensors, smoke detectors, vehicle sensors, proximity sensors, motion detectors, and open/close door sensors. IoT or M2M devices may be battery-operated devices.

Existing wireless communication networks, such as, for example, Long-Term Evolution (LTE) wireless networks, have introduced a power saving mode that is intended to improve the device battery life of, for example, IoT or M2M devices. This power saving mode enables battery powered user devices to power down during certain periods of time, and awaken and communicate with a wireless network during other periods of time. The power saving mode enables IoT or M2M devices to have more control over power management, when executing local applications, so as to extend the life of their battery power supplies.

DETAILED DESCRIPTION OF THE PREFERRED EMBODIMENTS

The following detailed description refers to the accompanying drawings. The same reference numbers in different drawings may identify the same or similar elements. The following detailed description does not limit the invention, which is defined by the claims.

The power saving mode (PSM), in existing wireless communication networks, involves a cooperative arrangement between the user devices and the wireless network that allows user devices to enter a low-power, PSM for long intervals. Use of the PSM, in turn, reduces the "chattiness" between the user devices and the radio towers of the wireless network, thereby enabling battery powered user devices to operate over longer time intervals, consuming far less battery capacity than non-PSM devices operating over the same time intervals. In the case of battery powered user devices, such as battery powered IoT or M2M devices, the user devices' controllers (e.g., microcontrollers or microprocessors) and modems continue to be powered by battery power even during the duration of the PSM. Therefore, even during a PSM interval, existing user devices' controllers and modems continue to consume battery capacity.

In exemplary embodiments described herein, an advanced power saving mode may be implemented at user equipment devices (UEs) that enables interruption of the supply of battery power to the UEs' modem such that, during the power saving mode, the UEs' modem does not consume battery power. Additionally, to avoid the modem losing its connection session credentials and security key(s) when completely powered down, the advanced power saving mode described herein additionally stores the session credentials and security key(s) in a non-volatile memory, such as, for example, in the memory of a smart card of the UEs, during the interval of time during which battery power is interrupted to the modem. Upon wake-up of the modem, at the end of the advanced power saving mode, the session credentials and security key(s) can be retrieved from the non-volatile memory such that the modem can then re-establish the previous connection and session with the wireless network without having to re-register with the wireless network.

Figure 1A:
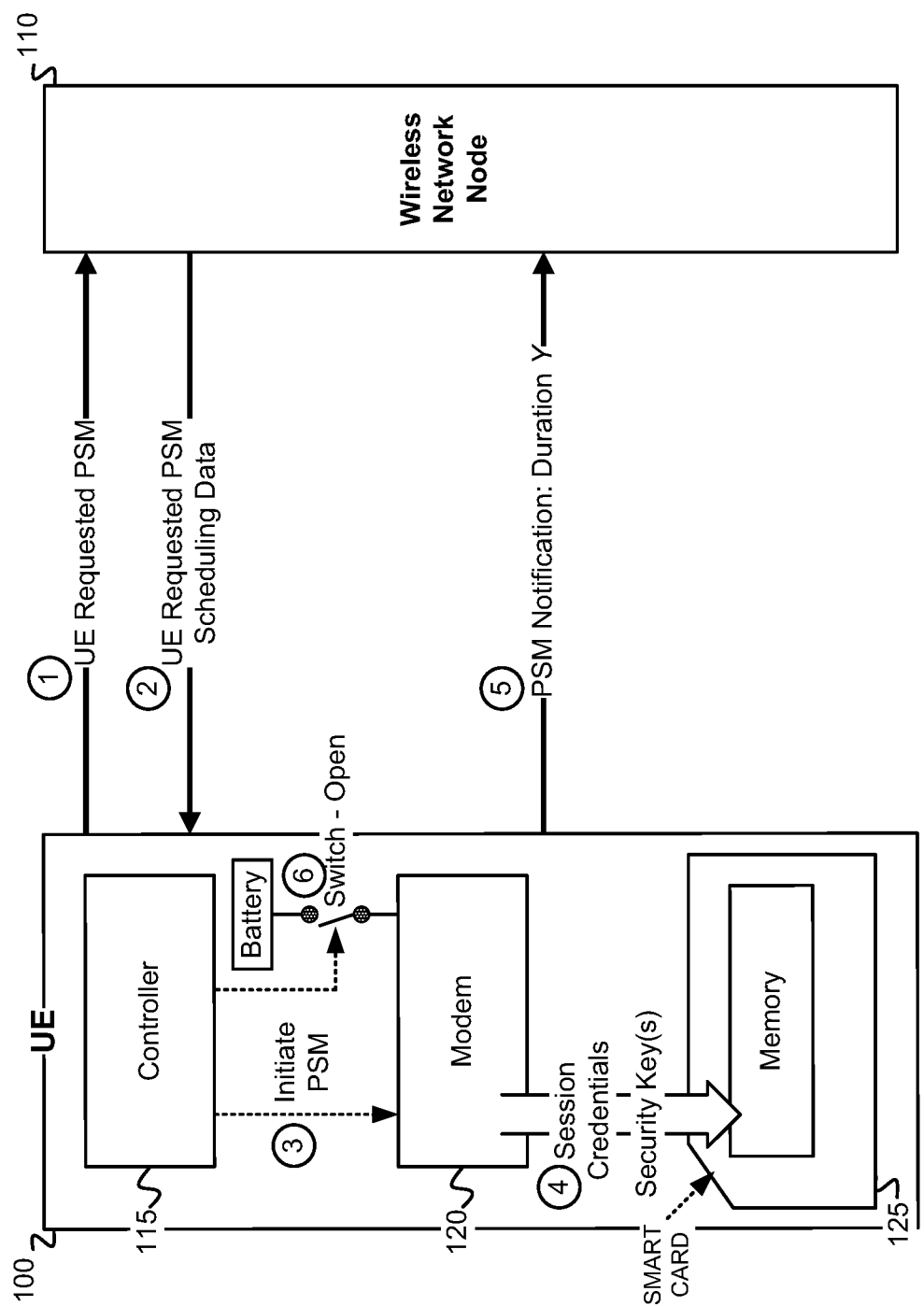
FIGS. 1A and 1B illustrate an exemplary overview of an implementation of an advanced power saving mode at a user equipment device.
Figure 1B:
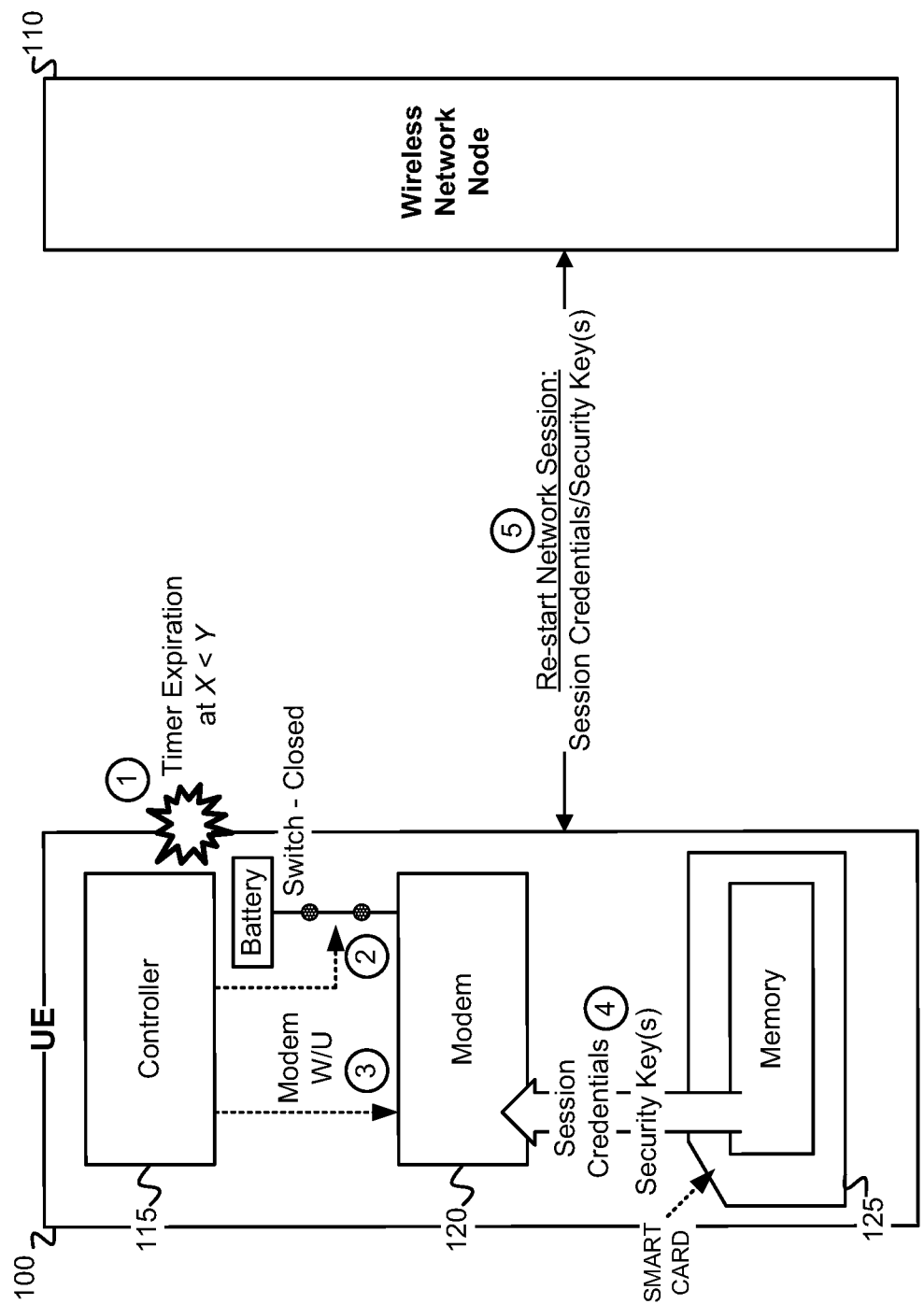

FIGS. 1A and 1B illustrate an exemplary overview of implementation of the advanced power saving mode at a UE. As shown in FIG. 1A, a UE 100, previously registered with and connected to a wireless network (not shown), may send a request (identified with a "1" within a circle) to enter a PSM to a node 110 of the wireless network. A previously executed UE registration and network connection process results in UE 100 maintaining session credentials and one or more security keys for the connection and/or the current network session. The node 110 may, in one implementation, be a Mobility Management Entity (MME) of the wireless network (e.g., in a Fourth Generation (4G) network, such as a Long Term Evolution (LTE) network). In another implementation, the node 110 may be an Access and Mobility Function (AMF) of the wireless network (e.g., in a Fifth Generation (5G) network). In further implementations, the node 110 may be a node, other than an MME or AMF, within the wireless network that implements functionality for processing power saving mode requests from UEs 100. Upon receipt of the PSM request, the node 110 schedules a PSM for the UE 100, and generates PSM scheduling data that may include one or more PSM timers. Node 110 returns the requested PSM scheduling data (identified with a "2" within a circle) to UE 100. For example, in LTE wireless network implementations, the request PSM scheduling data may include a T3342 active timer that defines a length of time that the UE 100 stays active after initiation of an idle mode at the UE 100 and during which the UE 100 engages in the monitoring of any paging from the wireless network, and a T3412 extended timer that defines a duration of time that the UE 100 stays in power saving mode and conserves power by shutting down all non-critical functionality.

In an alternative embodiment (not shown in FIG. 1A), UE 100 may implement a scheduling function, that involves a real-time clock and a calendar, to locally schedule, at UE 100, execution of a PSM without having to request the PSM from the wireless network. In this embodiment, the UE PSM request (identified with a "1" in FIG. 1A) and the receipt of the UE requested PSM scheduling data (identified with a "2") may be omitted. When a pre-scheduled PSM event has been triggered by the scheduling function at UE 100, then implementation of the PSM continues as described below.

After receipt of the requested PSM scheduling data from node 110 of the wireless network or after triggering of the pre-scheduled local PSM event using the UE 100's real-time clock and calendar, controller 115 of UE 110, based on the PSM scheduling data or the pre-scheduled local PSM event, sends a command (identified with a "3" within a circle) to modem 120 to initiate the PSM. For example, if the PSM scheduling data includes a T3342 active timer, controller 115 may send the PSM initiation command to modem 120 upon expiration of the duration of the T3342 timer. As another example, if a pre-scheduled local PSM event is to occur at a time $t_1$ on a date $D_1$ for a length of time $L_1$, then controller 115 may send the PSM initiation command to modem 120 at a time that is shortly before time $t_1$ on date $D_1$. Modem 120, in response to the command, stores (identified with a "4" within a circle) the session credentials and security key(s) for the current communication session with the wireless network within a non-volatile memory of UE 100. In one implementation, the non-volatile memory may include, as shown in FIG. 1A, a memory of a smart card 125 of UE 100. Smart card 125 may include, for example, a Subscriber Identity Module (SIM), a Universal Integrated Circuit Card (UICC), an embedded UICC (eUICC), or a Removable User Identity Module (R-UIM) card. In another implementation, the non-volatile memory may include a memory that resides in a Hardware Security Module (HSM) within, for example, a controller (or other component) of modem 120. Other types of non-volatile memories, residing within UE 100 or external to UE 100, may alternatively be used.

Modem 120 of UE 110, subsequent to storage of the current session credentials and security key(s), sends a PSM notification message (identified with a "5" within a circle) to the node 110 of the wireless network. The PSM notification message may include an identified duration Y of the PSM to be executed at UE 100. Duration Y may be determined based on the PSM scheduling data received from node 110, or based on a length $L_1$ of the PSM identified in the pre-scheduled local PSM event (i.e., $Y=L_1$). For example, if the scheduling data includes the T3412 extended timer, duration Y may be set equal to a length of the T3412 extended timer. After sending the PSM notification, controller 115 of UE 100 interrupts the supply of battery power to modem 120. In one implementation shown in FIG. 1A, controller 115 controls a switch, connected in series between the battery of UE 100 and the modem 120, to cause the switch to open (identified with a "6" within a circle), interrupting the supply of battery power to modem 120. Upon interrupting the supply of battery power to modem 120, UE 100 enters PSM, for a duration of time that is based on the identified duration Y, without de-registering from the wireless network or disconnecting from the current communication session with the wireless network. A timing circuit (not shown) initiates a timer that times a length of the PSM. Controller 115 of UE 100 may also enter a low-power mode during PSM.

FIG. 1B depicts UE 100 waking from the PSM that the UE 100 entered into in FIG. 1A. At the expiration of a duration X (identified with a "1" within a circle), where X<Y, a timing circuit (not shown) sends a wake-up command to the controller 115. Upon receipt of the wake-up command, and returning to its normal operating state, controller 115 provides battery power (identified with a "2" within a circle) to modem 120, and sends a wake-up command (identified with a "3" within a circle) to modem 120. Modem 120 retrieves (identified with a "4" within a circle) the previously stored session credentials and security key(s) from the non-volatile memory, such as, for example, from the memory of smart card 125. UE 100 may then re-start (identified with a "5" within a circle) the previous session, via the previously established connection, using the retrieved session credentials and security key(s). Since UE 100 did not de-register from the wireless network prior to entering into the PSM and has also maintained the previous session credentials and security key(s) through the PSM, UE 100 may re-start the previous connection and session using the retrieved session credentials and security key(s). As a result, time and battery usage during network de-registration and re-registration is saved.

Figure 2:
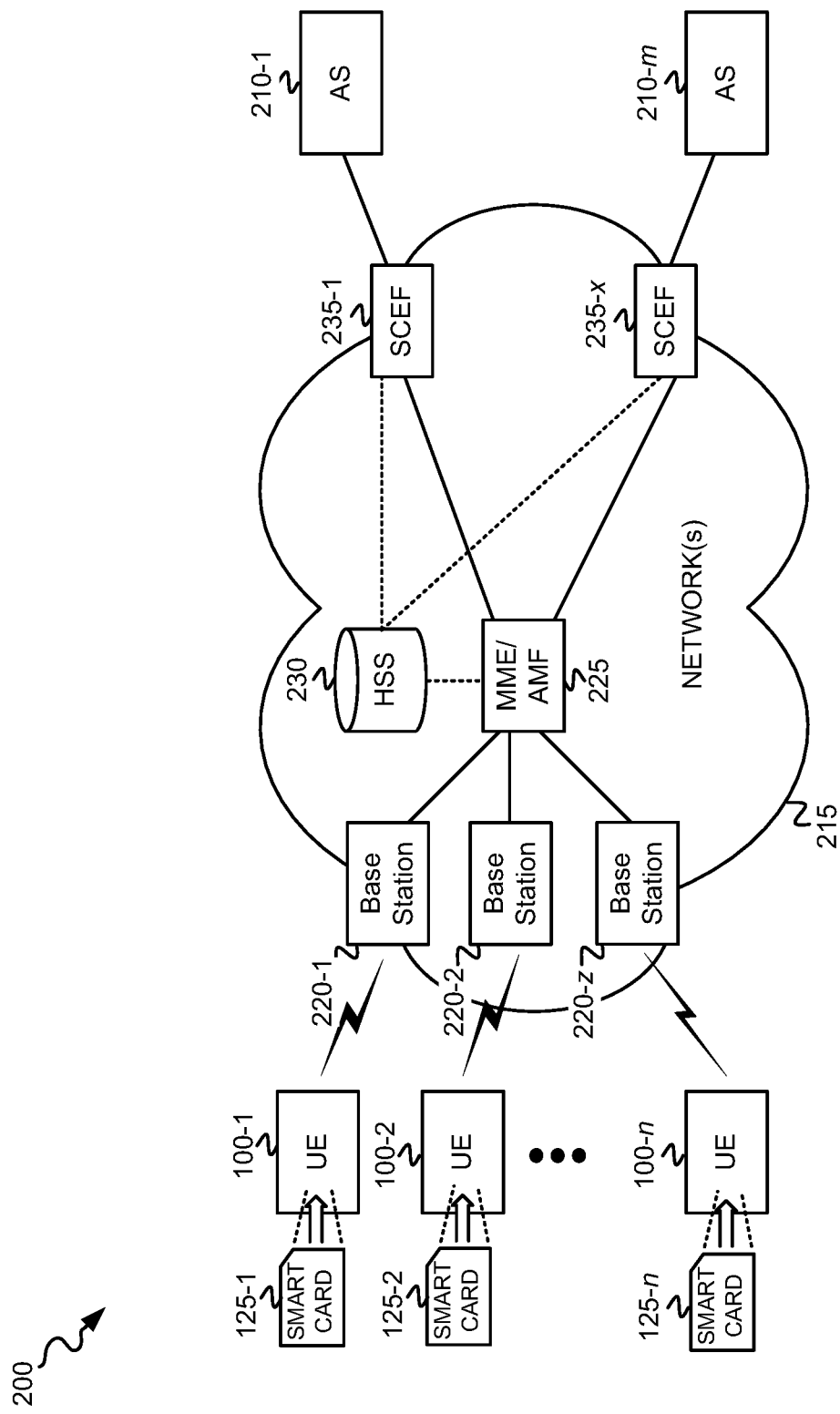
FIG. 2 depicts an exemplary network environment in which the advanced power saving mode may be implemented.

FIG. 2 depicts an exemplary network environment 200 in which a UE advanced power saving mode, as described herein, may be implemented. As shown, network environment 200 may include multiple UEs 100-1 through 100-$n$ (where n is greater than or equal to one), and multiple Application Servers (ASs) 210-1 through 210-$m$ (where m is greater than or equal to one, and m may not equal n) that connect to a wireless network(s) 215.

UEs 100-1 through 100-$n$ (referred to herein as "UE 100" or "UEs 100") may each include any type of electronic device that includes a wireless communication interface for communicating with network 215 via a wireless connection. In one implementation, at least some of UEs 100 may include a battery-powered electronic device, such as, for example, a battery-powered Machine-to-Machine (M2M) or "Internet of Things" (IoT) device. Other of UEs 100 may each include a battery-powered cellular telephone; a "smart" phone; a personal digital assistant (PDA); a wearable computer; a desktop, laptop, palmtop or tablet computer; or a media player. In some implementations, UEs 100 may be part of, or couple/connect to, a meter or meter interface unit (MIU), such as a water usage meter or a power usage meter. If part of a water usage meter, a UE 100 may transmit water consumption data, and water meter/MIU status information, to a water utility. If part of a power usage meter, a UE 100 may transmit power consumption data, and power meter/MIU status information, to a power utility.

A device user (not shown) may be associated with UEs 100, where the device user may be an owner, operator, administrator, and/or a permanent or temporary user of UEs 100. A single device user may be an owner, operator, administrator and/or a permanent or temporary user of multiple UEs 100. For example, a single device user may act as an operator or administrator of a group of M2M or IoT devices. As shown, each of UEs 100-1 through 100-$n$ may have a respective smart card 125-1 through 125-$n$ (referred to herein as "smart card 125" or "smart cards 125"). Each smart card 125 may be removable from a respective UE 100 (e.g., via a smart card slot within UE 100), or may be semi-permanently affixed within a respective UE 100.

ASs 210-1 through 210-$m$ (referred to herein as "AS 210" or "ASs 210") may each include one or more network devices that, among other functions, install, operate, and/or host applications, and associated services, for the UEs 100. Each AS 210 may send data to, or receive data from, one or more of UEs 100 at intervals at which the respective UEs 100 are awoken from PSM. ASs 210 may, in some implementations, be associated with a power or water utility that may monitor utility usage data (e.g., water usage or power usage data) sent from UEs 100 to ASs 210.

Wireless network(s) 215 includes one or more wireless networks. The one or more wireless networks may each include, for example, a wireless Public Land Mobile Network (PLMN) or a wireless satellite network that is operated and/or administered by a particular wireless network service provider (a "carrier"). The PLMN may include a Code Division Multiple Access (CDMA) 2000 PLMN, a GSM PLMN, a LTE PLMN, a 5G PLMN, and/or other types of PLMNs not specifically described herein. Though not shown in FIG. 2, the one or more wireless networks may interconnect with one or more other types of networks of various types. The one or more other types of networks may include, for example, a telecommunications network (e.g., Public Switched Telephone Networks (PSTNs)), a wired and/or wireless local area network (LAN), a wired and/or wireless wide area network (WAN), a metropolitan area network (MAN), an intranet, the Internet (e.g., an Internet Protocol (IP) network), an IP Multimedia Subsystem (IMS) network, and/or a cable network (e.g., an optical cable network).

FIG. 2 further depicts exemplary components of wireless network 215. As shown, wireless network 215 may include base stations 220-1 through 220-z, an MME/AMF 225, a Home Subscriber Server (HSS) 230, and Service Capability Exposure Function (SCEF) nodes 235-1 through 235-x (where x is greater than or equal to one). Though not shown, the wireless network of network(s) 215 may additionally include one or more serving gateways (SGWs) and/or packet data network (PDN) gateways (PGWs).

Base stations 220-1 through 220-z (generically referred to herein as "base station 220" or "base stations 220") each include hardware that wirelessly communicates with UEs 100 to enable wireless network service between the UEs 100 and network 215. Each of base stations 220 includes a wireless transceiver for communicating with UEs 100, and a wired or wireless link for connecting to other nodes of the wireless network 215 such as, for example, wired links to a SGW and/or MME/AMF 225. In some implementations (e.g., 4G), base stations 220 may include evolved NodeBs (eNBs). In other implementations (e.g., 5G), base stations 220 may include Next Generation NodeBs (gNBs).

MME/AMF 225 includes one or more network devices that perform one or more of mobility management, registration management, connection management, call control management, session management, and/or identity management associated with wireless network 215 providing wireless service to UEs 100. MME/AMF 225 may additionally serve as a node for scheduling the execution of PSM, and for allocating power saving mode timers to UEs 100, based on, for example, PSM requests from UEs 110. In implementations in which wireless network(s) 215 includes a 4G network, MME/AMF 225 may include a MME. In implementations in which the wireless network 215 includes a 5G network, MME/AMF 225 may include an AMF. Though not shown in FIG. 2, other network nodes in network(s) 215 may perform the functions described herein as being performed by MME/AMF 225. In some implementations, MME/AMF 225 of FIG. 2 may correspond to wireless network node 110 of FIGS. 1A and 1B.

HSS 230 includes one or more network devices that further include a memory device(s) that stores service profiles associated with particular users (i.e., service subscribers) and UEs 100. HSS 230 may perform, based on the information stored in the service profiles, a user authentication function, a session establishment function, and/or an access authorization function. Though not shown in FIG. 2, network nodes in network(s) 215 other than the HSS 230 may store, and enable retrieval of data from, the service profiles.

SGWs (not shown) of the wireless network 215 include one or more network devices that route and forward data received from UEs 100 and destined for destination nodes in network 215; and also route and forward data received from PGWs (not shown) destined for one or more UEs 100. The PGWs each include one or more network devices that provide connectivity from the UEs 100 to other networks connected to the wireless network 215, such as other external networks (not shown).

SCEF nodes 235-1 through 235-x (referred to herein as "SCEF node 235" or "SCEF nodes 235") may forward data, received (e.g., via Non-Internet Protocol (IP) data delivery) from MME 225 and/or UEs 100, to a respective destination AS 210 (i.e., SCEF 235-1 forwards data to AS 210-1, SCEF 235-x forwards data to AS 210-m). SCEF nodes 235 may additionally forward data, received (e.g., via non-IP data delivery) from ASs 210, to respective destination UEs 100 (e.g., to IoT devices).

The configuration of the components of network environment 200 depicted in FIG. 2 is for illustrative purposes only, and other configurations may be implemented. Therefore, network environment 200 may include additional, fewer and/or different components, that may be configured differently, than depicted in FIG. 2.

Figure 3:
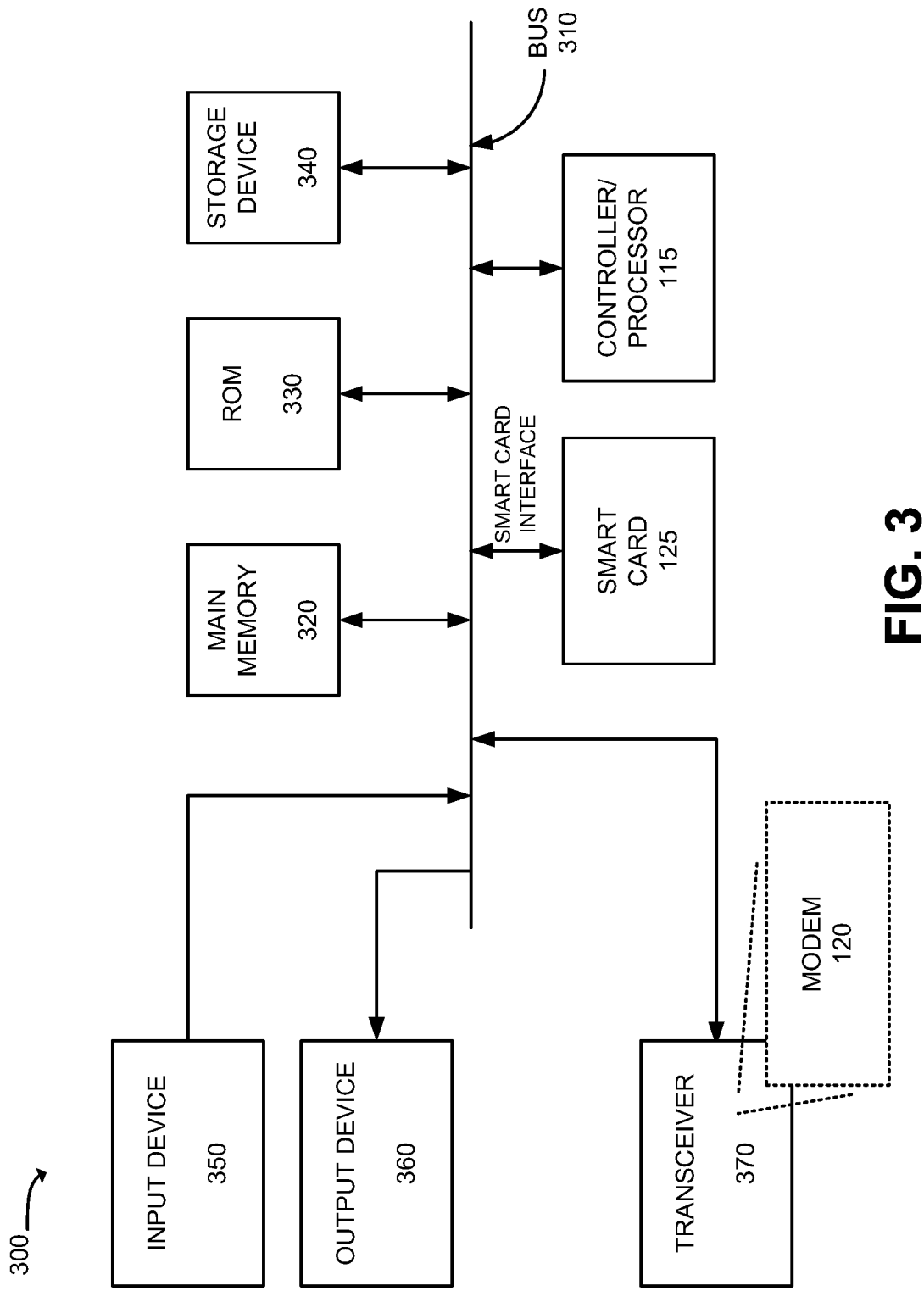
FIG. 3 is a diagram that depicts exemplary components of a device that may correspond to the user equipment devices, mobility management entity/access and mobility function, home subscriber server, and application servers of FIG. 2.

FIG. 3 is a diagram that depicts exemplary components of a device 300. UEs 100, base stations 220, node 110, MME/AMF 225, HSS 230, SCEF nodes 235, and ASs 210 may each include a device, or devices, similar to device 300, possibly with some variations in components and/or configuration. Device 300 may include a bus 310, a controller/processor 115, a smart card 125, a main memory 320, a read only memory (ROM) 330, a storage device 340, an input device 350, an output device 360, and a transceiver 370.

Bus 310 includes a path that permits communication among the components of device 300. Controller/processor 115 may include one or more controllers, microcontrollers, processors, or microprocessors which interpret and execute instructions. Controller/processor 115 may additionally, or alternatively, include logic circuitry (e.g., a field-programmable gate array (FPGA)) that executes one or more processes/functions. Smart card 125 may send and receive data via a smart card interface connected to bus 310. Main memory 320 may include a random-access memory (RAM) or another type of dynamic storage device that may store information and instructions for execution by controller/processor 115. ROM 330 may include a ROM device or another type of static storage device that stores static information and instructions for use by controller/processor 115. Storage device 340 may include a magnetic and/or optical recording medium. Main memory 320, ROM 330 and storage device 340 may each be referred to herein as a "non-transitory computer-readable medium" or a "non-transitory storage medium."

Input device 350 may include one or more devices that permit an operator to input information to device 300, such as, for example, a keypad or a keyboard, a display with a touch sensitive panel, voice recognition and/or biometric mechanisms, etc. Output device 360 may include one or more devices that output information to the operator or user, including a display (e.g., with a touch sensitive panel), a speaker, etc. Input device 350 and output device 360 may be implemented as a graphical user interface (GUI) (e.g., a touch screen GUI that uses any type of touch screen device) that displays GUI information and which receives user input via the GUI. Transceiver 370 may include one or more transceivers that enable device 300 to communicate with other devices and/or systems. For example, transceiver 370 may include wired and/or wireless transceivers for communicating via network 215. In some implementations, transceiver 370 may include modem 120 for communicating with a base station 220 of wireless network 215.

The configuration of components of network device 300 shown in FIG. 3 is for illustrative purposes. Other configurations may be implemented. Therefore, network device 300 may include additional, fewer and/or different components, arranged in a different configuration, than depicted in FIG. 3. For example, an IoT UE 100 may include similar components to those shown in FIG. 3, but may omit input device 350, output device 360, and/or storage device 340. A UE 100 may further include additional components (e.g., a battery, a timing circuit, and a switch), such as those depicted in FIG. 5 below, that are not shown in FIG. 3.

Figure 4:
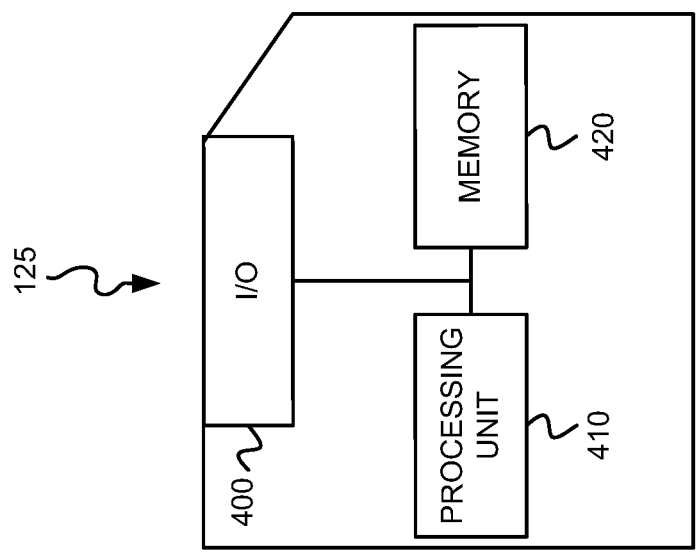
FIG. 4 is a diagram that depicts exemplary components of a smart card of FIGS. 1A, 1B, and 2.

FIG. 4 is a diagram that depicts exemplary components of smart card 125. Smart card 125 may include input/output (I/O) circuitry 400, a processing unit 410, and a memory 420. Input/output circuitry 400 may include circuitry for inputting data to smart card 125 from UE 100 (e.g., via bus 310 of FIG. 3), and output circuitry for outputting data from smart card 125 to UE 100 (e.g., via bus 310). Processing unit 410 may include a controller, microcontroller, processor, microprocessor, or processing logic that may interpret and execute instructions. Memory 420 may include RAM, ROM, and/or Electrically Erasable Programmable Read-Only Memory (EEPROM) that may store data and may store instructions for execution by processing unit 410.

Smart card 125 may perform certain operations or processes. Smart card 125 may perform these operations in response to processing unit 410 executing software instructions contained in a non-transitory computer-readable storage medium, such as memory 420. The configuration of components of smart card 125 illustrated in FIG. 4 is for illustrative purposes only. Other configurations may be implemented. Therefore, smart card 125 may include additional, fewer and/or different components, arranged in a different configuration, than depicted in FIG. 4.

Figure 5:
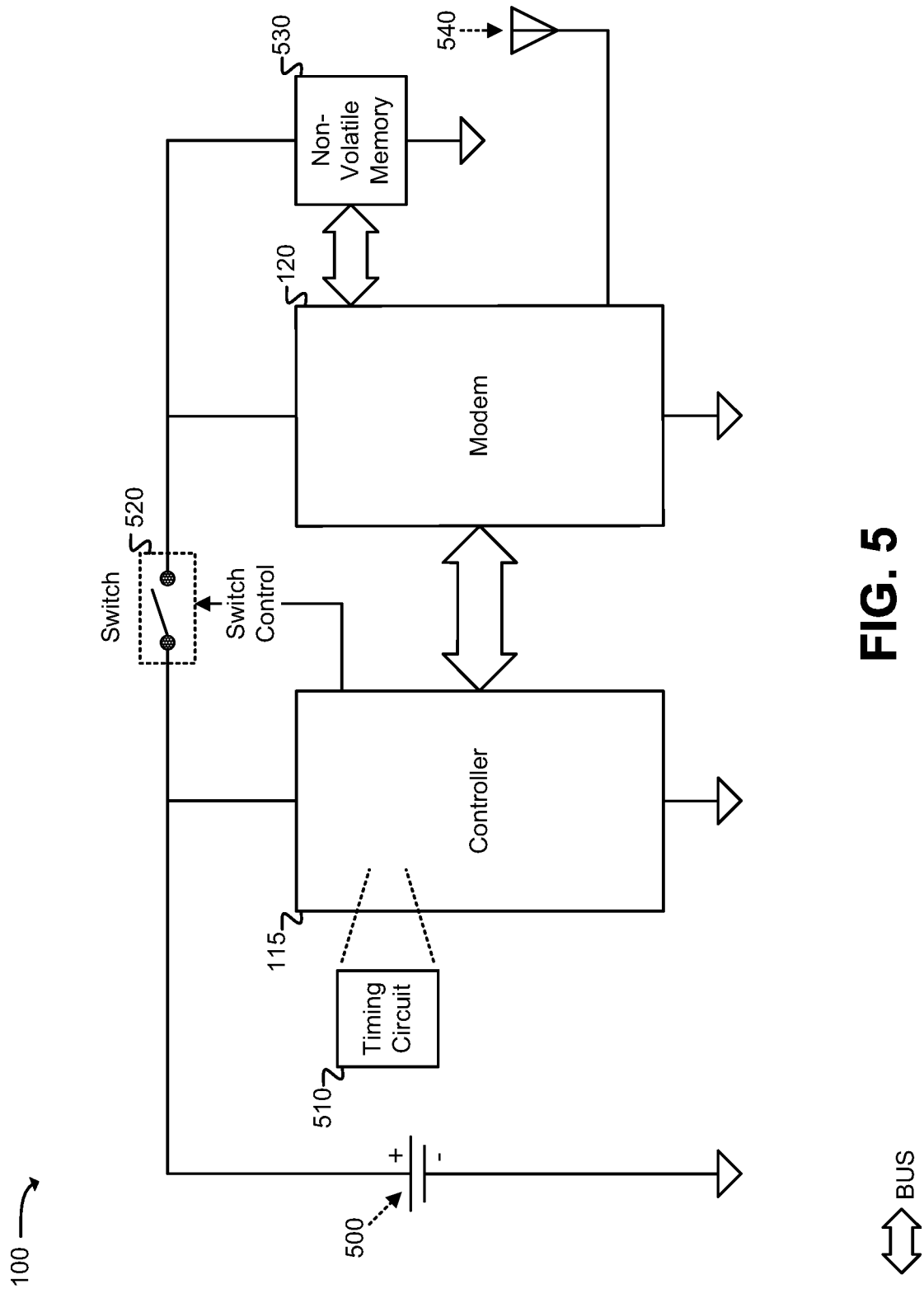
FIG. 5 illustrates exemplary components of the user equipment device that are associated with implementing the advanced power saving mode.

FIG. 5 illustrates exemplary components of UE 100 associated with implementing the advanced power saving mode at UE 100. As shown, UE 100 may include a battery 500, a timing circuit 510, controller 115, a switch 520, modem 120, a non-volatile memory 530, and an antenna 540. FIG. 5 depicts components of UE 100 that are involved in implementing the advanced power saving mode, such as powering up and powering down UE 100 during intervals of PSM.

Battery 500 may include any type of battery for supplying power (e.g., direct current (DC) power) to components of UE 100. Battery 500 may supply power to modem 120 and memory 530 via an intervening switch 520 that is series-connected between battery 500 and modem 120 and memory 530.

Timing circuit 510 may include low power circuitry that counts a timing interval that is based on a PSM timer value received from wireless network 215. In one implementation, as shown in FIG. 5, timing circuit 510 may be an internal component of controller 115. In this implementation, if controller 115 is powered down or reduced to an inactive, low-power state, then timing circuit 510 continues to operate to provide timing data for UE 100. In other implementations (not shown), timing circuit 510 may include circuitry that is external to controller 115, such as, for example, stand-alone low power circuitry that connects to controller 115 via bus 310. In some embodiments, UE 100 may receive PSM scheduling data that includes a timer value Y (e.g., in minutes and/or seconds) from node 110 of wireless network 215. Controller 115 determines (as described in further detail below) a timing value X, where X<Y, based on the received timer value Y and sends the timing value X to timing circuit 510. Timing circuit then sets a PSM internal timer based on the timing value X. The internal timer may, for example, count down (e.g., in seconds) from the timing value X to zero, or count up from zero (e.g., in seconds) to the timing value X.

Controller 115 supplies the PSM timing value to timing circuit 510 for execution of the PSM internal timer. Controller 115 additionally supplies PSM initiation, and PSM wake-up, commands to modem 120. Controller 115 further sends control signals to switch 520 to cause switch 520 to interrupt, or provide, the supply of power from battery 500 to modem and memory 530. Switch 520 may include any type of switch that is controllable by a control signal from controller 115.

In other embodiments, timing circuit 510, by itself or in conjunction with controller 115, may implement a scheduling function that includes a real-time clock, and an associated calendar, to enable the local scheduling of PSM at UE 100 without a need to obtain PSM scheduling data from the wireless network. In this embodiment, when a pre-scheduled date and time arrives, as determined by the real-time clock and calendar, a pre-scheduled PSM is triggered, and a PSM notification is sent by UE 100 to the wireless network to notify the network of the timing and length of the triggered PSM. Upon triggering of the pre-scheduled PSM, controller 115 sends a command to modem 120 to initiate the PSM. Modem 120, upon receipt of the PSM command, stores the session credentials and security key(s) in the non-volatile memory 530, and controller 115 then causes switch 520 to open to interrupt the supply of power from battery 500 to modem 120.

Modem 120 includes circuitry for wirelessly communicating with wireless network 215. Upon receipt of a PSM initiation command from controller 115, modem 120 stores session credentials and a security key(s) for a current network session in non-volatile memory 530. Non-volatile memory 530 may include any type of device that further includes non-volatile memory. In one implementation, non-volatile memory 530 may be memory 420 of smart card 125. In some implementations, modem 120 may further include a Hardware Security Module (HSM) that safeguards and manages digital keys for authentication and/or encryption, and which may further execute crypto-processing. The HSM may include internal non-volatile memory 530 that may be used for storing the UE 100's session credentials and security key(s) during a duration of a PSM. Antenna 540 includes any type of antenna that enables modem 120 to transmit and/or receive radio frequency signals to/from wireless network 215.

Figure 6A:
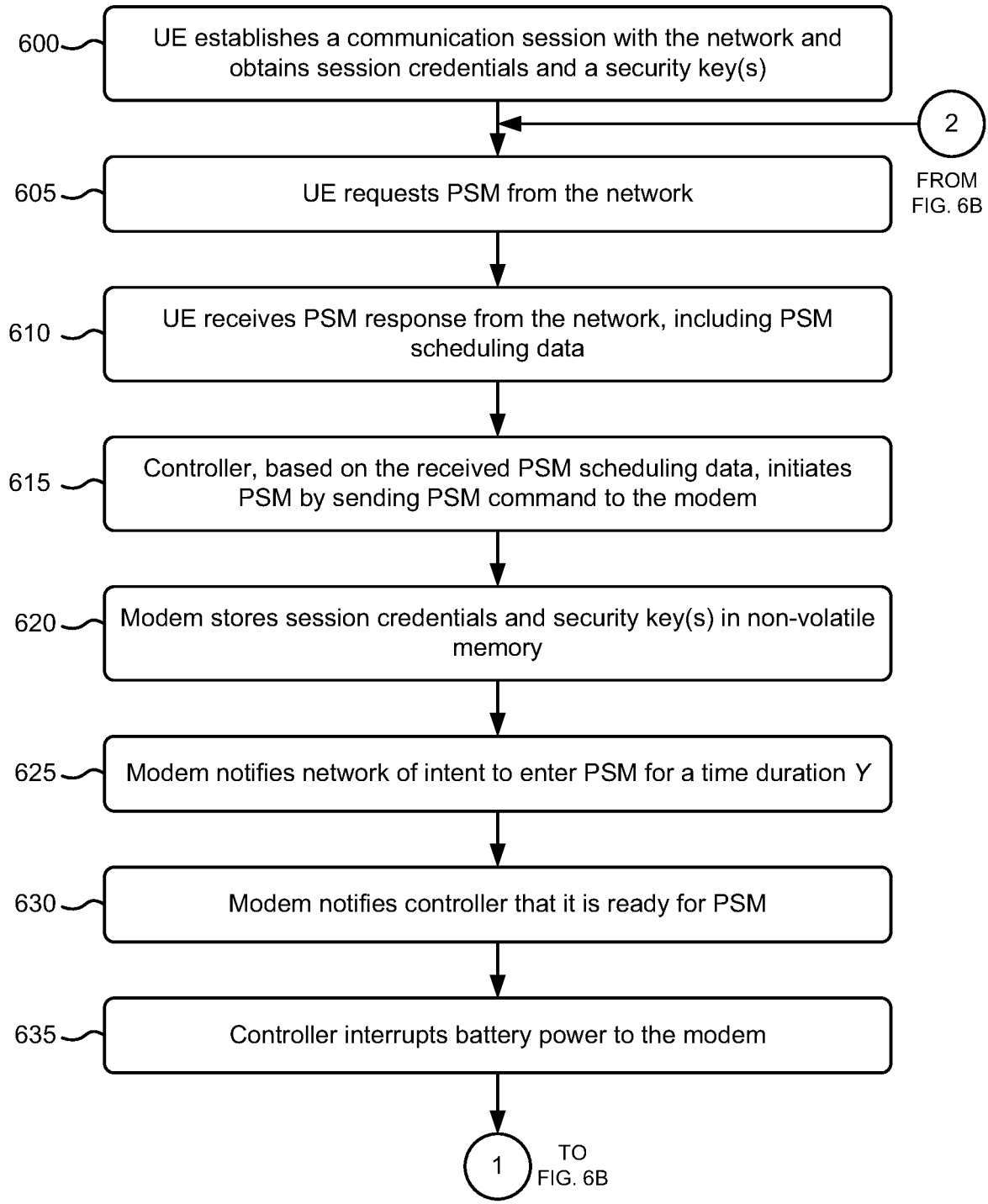
FIGS. 6A and 6B are flow diagrams that illustrate an exemplary process for implementing the advanced power saving mode at a user equipment device.
Figure 6B:
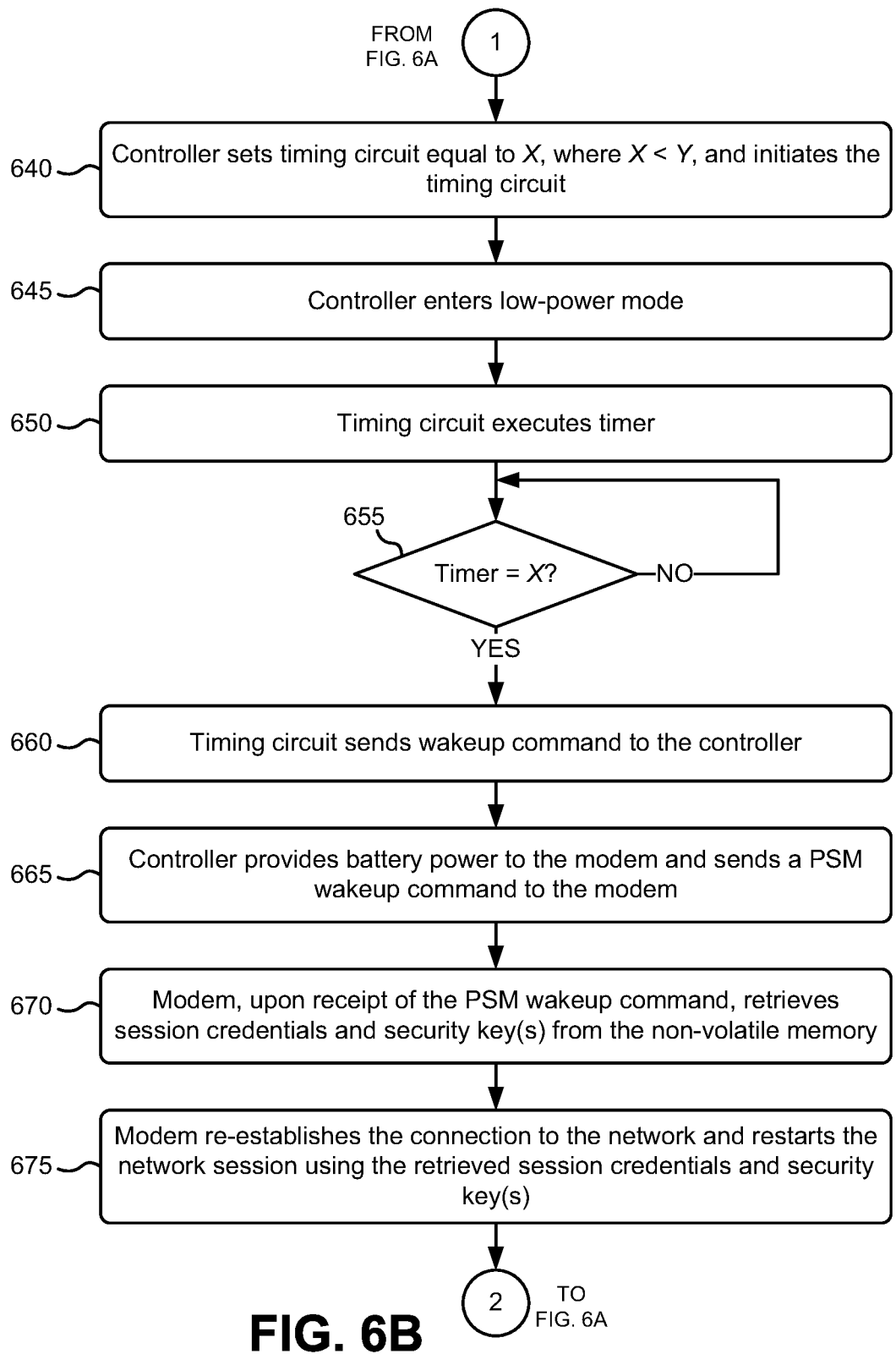

FIGS. 6A and 6B are flow diagrams that illustrate an exemplary process for implementing the advanced power saving mode, described herein, at a UE 100. In one implementation, the exemplary process of FIGS. 6A and 6B may be implemented by UE 100, in conjunction with node 110 (and/or another node(s)) of wireless network 215.

The exemplary process includes UE 100 establishing a communication session with wireless network 215 and obtaining session credentials and a security key(s) (block 600). Establishment of the communication session may include, for example, engaging in Radio Resource Control (RRC) setup with MME/AMF 225 of wireless network 215 and sending an Attach Request from UE 100 to MME/AMF 225. Subsequent to the Attach Request, UE 100 may, for example, engage in an Authentication and Key Agreement (AKA) process with MME/AMF 225 to obtain the session credentials and the security key(s). The security key(s) and the session credentials may include, for example, a shared secret key ($K_i$), an authentication vector (AV) derived by MME/AMF 225 using $K_i$ and a cryptographic algorithm, a response token (RES) generated by UE 100 based on $K_i$, non-access stratum (NAS) keys for protecting NAS signaling between UE 110 and MME/AMF 225, and/or RRC keys for protecting communications between UE 110 and the serving base station 220 of wireless network 215. Other types of session credentials and/or session key(s) may be obtained by UE 100 depending on the protocols implemented by the particular wireless network 215.

UE 100 requests a power saving mode from wireless network 215 (block 605). UE 100 may send a separate message to node 110 of wireless network 215 to request the power saving mode. Alternatively, UE 110 may send an attach request, that may be a component of session establishment in block 600, that includes data requesting the power saving mode. UE 100 receives, in response to the PSM request, a PSM response from wireless network 215 that includes PSM scheduling data (block 610). Upon receipt of the PSM request from UE 100, node 110 of wireless network 215 schedules a PSM for the UE 100, and generates corresponding PSM scheduling data for implementation of the PSM at the UE 100. In one implementation, scheduling the PSM for the UE 100 may include allocating one or more PSM timer values to the UE 100 and returning a PSM response message that includes the one or more allocated PSM timer values. In some implementations, the PSM scheduling data includes a first PSM timer value that defines a length of time that the UE 100 stays active after initiation of an idle mode at the UE 100 and during which the UE 100 engages in the monitoring of any paging from the wireless network 215. The PSM scheduling data may also include a second PSM timer value that defines a duration of time (Y) that the UE 100 stays in power saving mode and conserves power by shutting down all non-critical functionality. In a LTE implementation, the first PSM timer may include a T3342 active timer and the second PSM timer may include a T3412 extended timer. In other implementations, different PSM timer values, that establish a schedule and duration associated with execution of the PSM at the UE 100, may be defined and used based on application requirements.

In embodiments in which UE 100 implements a local scheduling function to schedule PSM events, blocks 605 and 610, described above, may be omitted. In these embodiments, when the UE 100's real-time clock and calendar trigger a pre-scheduled PSM event, then controller 115 retrieves a time $t_1$, date $D_1$, and length $L_1$ of the pre-scheduled PSM event and the PSM is implemented, as described further below, based on the time $t_1$, date $D_1$, and length $L_1$ of the pre-scheduled PSM event.

Controller 115 of UE 100, based on the received PSM scheduling data or the locally pre-scheduled PSM event, initiates PSM by sending a PSM command to modem 120 (block 615). For example, if the PSM scheduling data includes the first PSM timer that defines a length of time that UE 100 stays active after initiating an idle mode and during which UE 100 engages in the monitoring of paging from wireless network 215, then controller 115 initiates the PSM subsequent to expiration of the duration of the first PSM timer value. As a specific example, if the first PSM timer includes a time value having a duration of 1 hour, then controller 115, once in the idle mode, continues to monitor paging from wireless network 215 until expiration of the 1 hour duration, at which time controller 115 sends a PSM command to modem 120 to initiate the PSM. Referring to FIG. 5, controller 115 sends a command (via the double pointed arrow representing bus 310) to modem 120. The command may include data that indicates that modem 120 should begin operations for going into the PSM.

Modem 120, upon receipt of the PSM command from controller 115, stores the session credentials and security key(s) in non-volatile memory 530 (block 620). Referring to FIG. 5, modem 120 sends (via the double pointed arrow representing bus 310) the session credentials and security key(s) to non-volatile memory 530. In one exemplary implementation, non-volatile memory 530 may include memory 420 of smart card 125. In such an implementation, modem 120 sends the session credentials and security key(s), via bus 310, to I/O 400 of smart card 400, and processing unit 410 receives the data from I/O 400 and causes the session credentials and security key(s) to be stored in memory 420. In another exemplary implementation, non-volatile memory 530 may include a memory residing in a HSM within modem 120.

Modem 120 notifies wireless network 215 of an intent to enter PSM for a time duration Y (block 625) and notifies controller 115 that it is ready for PSM (block 630). Time duration Y may be a time, in seconds, minutes, and/or hours, over which the UE 100 is to be in power saving mode. In an embodiment in which UE 100 locally schedules PSM using a real-time block and calendar, Y may equal the length $L_1$ of a pre-scheduled PSM event. Controller 115 interrupts battery power to modem 120 (block 635). In one implementation, such as shown in FIG. 5, controller 115 may issue a control signal that causes switch 520 to open, interrupting the supply of DC power from battery 500 to modem 120 and non-volatile memory 530.

Controller 115 sets timing circuit 510 equal to X, where X<Y, and initiates the timing circuit 510 (block 640). Controller 115 may subtract a time value Z from PSM duration Y to obtain timing circuit value X, where Z is equal to an estimated amount of time for modem 120 to wake-up from the PSM, retrieve session credentials and a security key(s) from non-volatile memory 530, and begin re-establishing a network session with wireless network 215. Controller 115 loads timing circuit 510 with the determined timing circuit value X.

Controller 115 enters low-power mode (block 645). To conserve UE power, controller 115 may enter a low-power mode in addition to interruption of power to modem 120. In low-power mode, functionality of controller 115 may be switched off, except for, for example, its clock-keeping capability. Timing circuit 510 executes the timer (block 650) and determines when the timer is equal to X (block 655). In one implementation, timing circuit 510 may count (e.g., in increments of milliseconds, or seconds) up from a zero value to the timing circuit value X. In another implementation, timing circuit 510 may count down from the timing circuit value X to zero. When the timer is equal to X (YES—block 655), timing circuit 510 sends a wakeup command to controller 115 (block 660). Until the timer is equal to X (NO—block 655), the timer of timing circuit 510 continues to count up to X from zero, or from X down to zero.

Controller 115, upon receipt of the wake-up command, provides battery power to modem 120 and then sends a PSM wake-up command to modem 120 (block 665). In one exemplary implementation, such as shown in FIG. 5, controller 115 may issue a control signal that causes switch 520 to close, resulting in re-establishing the supply of DC power from battery 500 to modem 120 and non-volatile memory 530. Controller 115 additionally sends the PSM wake-up command to modem 120 via bus 310. Modem 120, upon receipt of the PSM wake-up command, retrieves session credentials and a security key(s) from non-volatile memory 530 (block 670). Referring to FIG. 5, modem 120 retrieves the previously stored session credentials and the security key(s) from non-volatile memory 530 via bus 310.

Modem 120 re-establishes the connection to the wireless network 215 and restarts the network session using the retrieved session credentials and security key(s) (block 675). Modem 120 sends signaling to wireless network 215 to re-establish the pre-PSM connection and to re-start the pre-PSM network session. The signaling utilizes, via existing protocols, the retrieved session credentials and security key(s) to re-establish the connection and restart the network session. Re-establishing the network connection is this manner saves time and battery life as compared to re-registering UE 100 with new session credentials and/or security keys. The exemplary process may, for example, continue at block 605, with UE 100 requesting another PSM from wireless network 215 at a later time. For example, in implementations in which UE 100 is a meter interface unit associated with a utility meter (e.g., a water meter, a electricity meter, a gas meter, etc.), UE 100 may enter a PSM for relatively long durations (e.g., 1 day, 1 week, 1 month) and awaken to transmit meter data to a utility company at periodic intervals.

The exemplary process of FIGS. 6A and 6B may be initiated by a UE 100, which includes functionality for the advanced power saving mode described herein, each time a new communication session is to be established between the UE 100 and a wireless network 215.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6A and 6B, and message/operations flows with respect to FIGS. 1A and 1B, the order of the blocks and/or the message/operations flows may be varied in other implementations. Moreover, non-dependent blocks may be performed in parallel. Implementations are described herein as receiving PSM scheduling data from wireless network 215, and UE 100 entering the PSM based on the content of the PSM scheduling data. In other implementations, however, the PSM scheduling may be performed locally at UE 100, and UE 100 may enter the PSM without having to obtain PSM scheduling data from the wireless network 215.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   establishing, by a user equipment device (UE), a communication session with a wireless network;
   sending a power-saving mode (PSM) request, by the UE to a node of the wireless network, for the UE to enter a PSM;
   receiving, by the UE from the node of the wireless network responsive to the PSM request, a message that includes PSM scheduling data for scheduling the PSM at the UE;
   interrupting, by the UE at a first time based on the PSM scheduling data, a supply of power to a modem of the UE; and
   providing, by the UE based on the PSM scheduling data at a second time that is subsequent to the first time, power to the modem.

2. The method of claim 1, further comprising:
   storing, by the UE based on the PSM scheduling data, at least one of session credentials or security keys associated with the communication session in a non-volatile memory;
   retrieving, upon providing power to the modem, the at least one of session credentials or security keys from the non-volatile memory; and
   re-establishing, by the modem, the communication session with the wireless network using the retrieved at least one of session credentials or security keys.

3. The method of claim 1, wherein interrupting the supply of power to the modem further comprises:
   opening a switch that is connected between a battery and the modem to interrupt power to the modem, and
   wherein providing power to the modem further comprises:
   closing the switch that is connected between the battery and the modem to provide the power to the modem.

4. The method of claim 2, wherein the non-volatile memory comprises a smart memory card or a Hardware Security Module (HSM) residing within the UE.

5. The method of claim 1, wherein the UE comprises a meter interface unit associated with a utility meter.

6. A user equipment device (UE), comprising:
   a modem configured to:
      establish a communication session with a wireless network; and
   a controller configured to:
      send a power-saving mode (PSM) request, via the modem to a node of the wireless network, for the UE to enter a PSM;

receive, from the node of the wireless network via the modem responsive to the PSM request, a message that includes PSM scheduling data for scheduling the PSM at the UE;

interrupt, at a first time based on the PSM scheduling data, power to the modem; and provide, based on the PSM scheduling data at a second time that is subsequent to the first time, power to the modem.

7. The UE of claim 6, wherein the UE comprises a meter interface unit associated with a utility meter.

8. The UE of claim 6, further comprising:
a battery connected to the modem,
wherein the controller, when interrupting power to the modem, is further configured to:
open a switch that is connected between the battery and the modem to interrupt the power to the modem, and
wherein the controller, when providing power to the modem, is further configured to:
close the switch that is connected between the battery and the modem.

9. The UE of claim 6, further comprising:
a non-volatile memory; and
wherein the modem is further configured to:
store, based on the PSM scheduling data, at least one of session credentials or security keys associated with the communication session in the non-volatile memory,
retrieve, upon providing the power to the modem, the at least one of the session credentials or security keys from the non-volatile memory, and
re-establish the communication session with the wireless network using the retrieved at least one of the session credentials or security keys.

10. The UE of claim 9, wherein the non-volatile memory comprises a smart memory card or a Hardware Security Module (HSM) residing within the UE.

11. A non-transitory storage medium storing instructions executable by a processor or controller of a user equipment device (UE), wherein the instructions comprise instructions to cause the processor or controller to:
cause a modem of the UE to establish a communication session with a wireless network;
send a power-saving mode (PSM) request, to a node of the wireless network, for the UE to enter a PSM;
receive, from the node of the wireless network via the modem, a message that includes power-saving mode (PSM) scheduling data for scheduling a PSM at the UE;
interrupt, at a first time based on the PSM scheduling data, a supply of power to the modem; and
provide, based on the PSM scheduling data at a second time that is subsequent to the first time, power to the modem.

12. The non-transitory storage medium of claim 11, wherein the instructions further comprise instructions to cause the processor or controller to:
store, based on the PSM scheduling data, at least one of session credentials or security keys associated with the communication session in a non-volatile memory;
cause the modem to retrieve, upon providing the power to the modem, the at least one of session credentials or security keys from the non-volatile memory; and
cause the modem to re-establish the communication session with the wireless network using the retrieved at least one of session credentials or security keys.

13. The non-transitory storage medium of claim 12, wherein the non-volatile memory comprises a smart memory card or a Hardware Security Module (HSM) residing within the UE.

14. The non-transitory storage medium of claim 11, wherein the instructions to cause the processor or controller to interrupt the supply of power to the modem further comprise instructions to cause the processor or controller to:
open a switch that is connected between a battery and the modem to interrupt the power to the modem, and
wherein the instructions to cause the processor or controller to provide power to the modem further comprise instructions to cause the processor or controller to:
close the switch that is connected between the battery and the modem.

15. The non-transitory storage medium of claim of claim 11, wherein the UE comprises a meter interface unit associated with a utility meter.

16. The method of claim 1, further comprising:
notifying, by the UE, the node of the wireless network of an intent to enter PSM for a time period that is based on the PSM scheduling data.

17. The method of claim 1, wherein the PSM scheduling data comprises a PSM timer value that defines a duration of time that the UE stays in PSM.

18. The UE of claim 6, wherein the controller is further configured to:
notify, by the UE via the modem, the node of the wireless network of an intent to enter PSM for a time period that is based on the PSM scheduling data.

19. The UE of claim 6, wherein the PSM scheduling data comprises a PSM timer value that defines a duration of time that the UE stays in PSM.

20. The non-transitory storage medium of claim 11, wherein the instructions further comprise instructions to cause the processor or controller to:
notify the node of the wireless network of an intent to enter PSM for a time period that is based on the PSM scheduling data.

* * * * *